May 7, 1935.  F. P. TAUGHER  2,000,724
CRANE HOIST CONTROL
Filed Sept. 30, 1932   3 Sheets—Sheet 1

WITNESSES:

INVENTOR
Frank P. Taugher.
BY
ATTORNEY

May 7, 1935.  F. P. TAUGHER  2,000,724
CRANE HOIST CONTROL
Filed Sept. 30, 1932   3 Sheets-Sheet 2
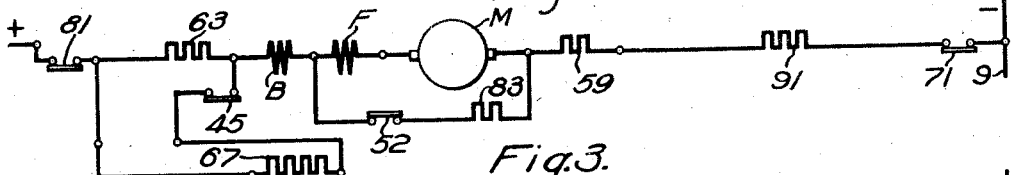
Fig. 2.
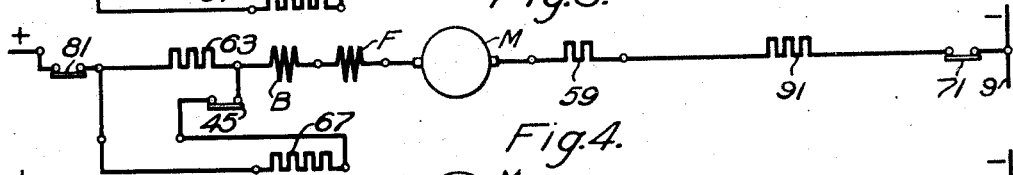
Fig. 3.
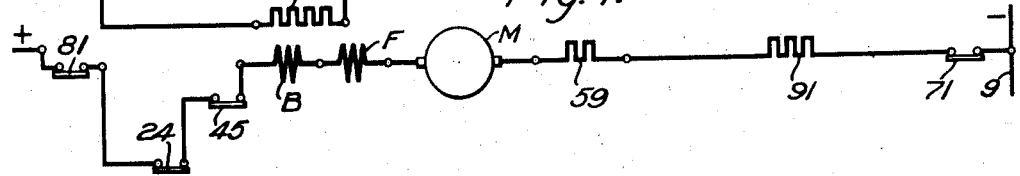
Fig. 4.
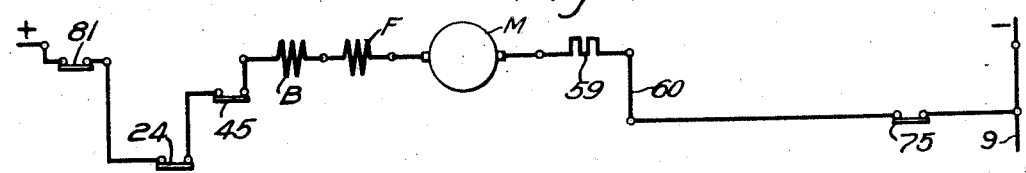
Fig. 5.
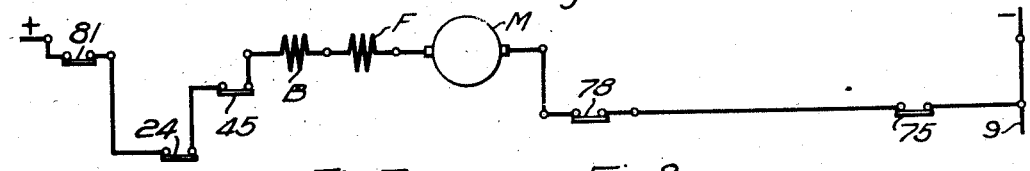
Fig. 6.
Fig. 7.
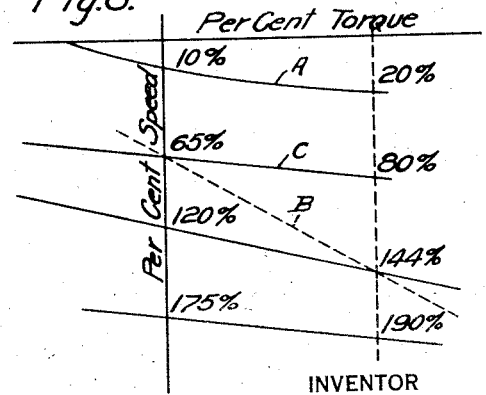
Fig. 8.
WITNESSES:
R. J. Fitzgerald
Paul E. Friedemann
INVENTOR
Frank P. Taugher.
BY W. R. Coley
ATTORNEY May 7, 1935.  F. P. TAUGHER  2,000,724
CRANE HOIST CONTROL
Filed Sept. 30, 1932   3 Sheets-Sheet 3
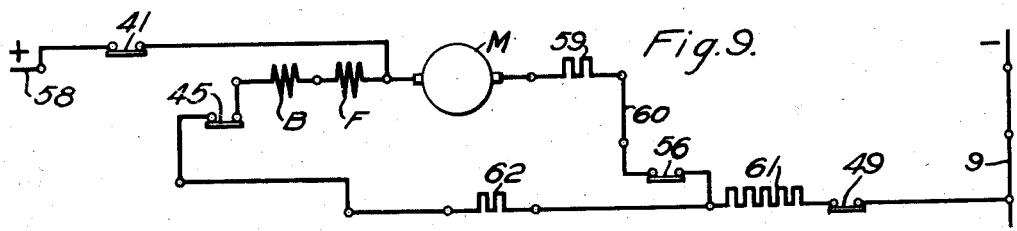
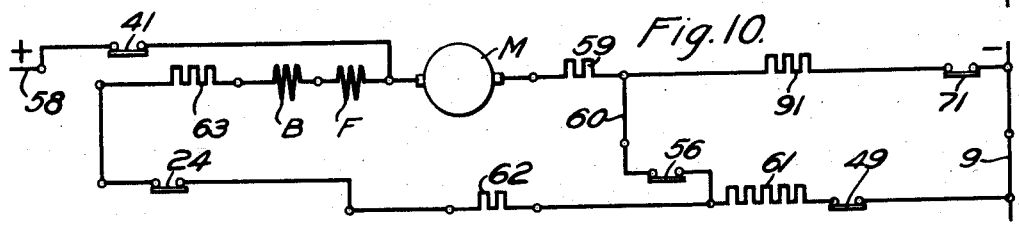
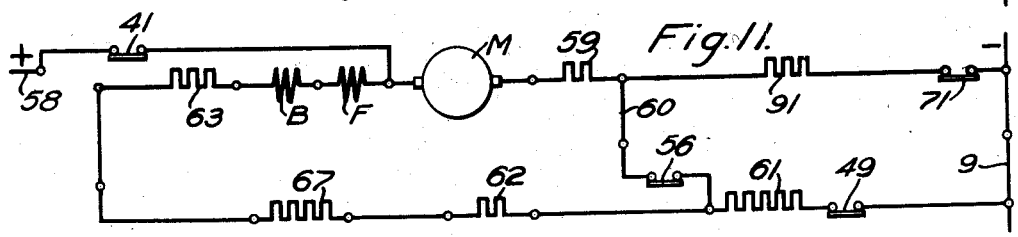
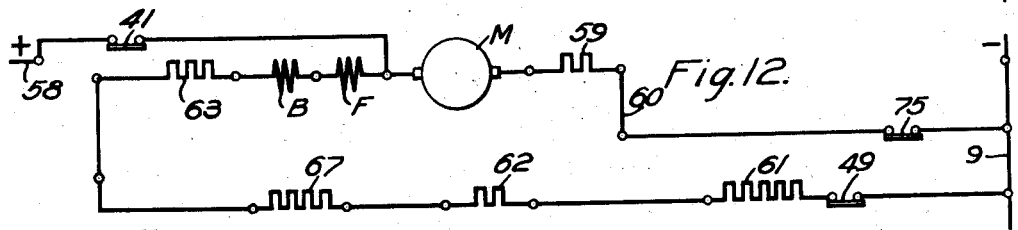
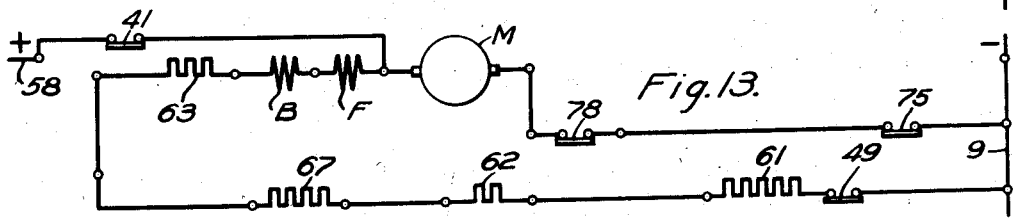
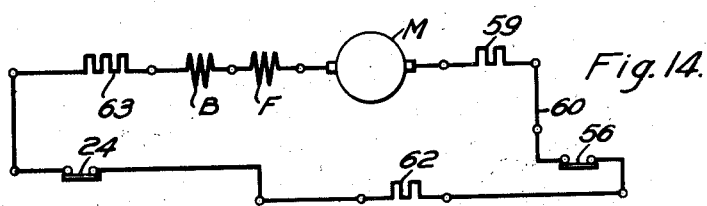
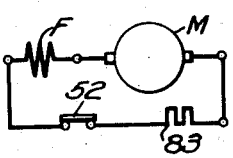
WITNESSES:
INVENTOR
Frank P. Taugher.
BY
ATTORNEY Patented May 7, 1935

2,000,724

UNITED STATES PATENT OFFICE 2,000,724

CRANE HOIST CONTROL

Frank P. Taugher, Forest Hills, Pa., assignor to Westinghouse Electric & Manufacturing Company, East Pittsburgh, Pa., a corporation of Pennsylvania Application September 30, 1932, Serial No. 635,530

7 Claims. (Cl. 172—179)

This invention relates to control systems for electric motors and is particularly applicable to motors utilized for operating load hoisting or elevating devices and load lowering devices.

One object of this invention is the provision of systems of control that embody but few units, that may be simple in arrangement and operation, be inexpensive, and that may readily be manufactured and easily installed.

Another object of this invention is the provision of a load lowering controller for a hoist which will provide the most desirable speed torque curves for the motor operating the hoist in the lowering direction regardless of whether the load be overhauling or not, and which shall nevertheless provide the most desirable hoisting characteristics for the motor when operating the hoist in the hoisting direction.

Another object of this invention is the provision of a control system providing substantially ideal or most desirable speed torque curves for a hoist motor when operating in the lowering direction.

It is also an object of this invention to provide for substantially the same and the most desirable motor regulation from no-load to full-load, i. e., the same slope for the speed torque curves of the motor from no-load to full-load for each operating position of the control system.

Another object of this invention is the provision of a control system which will provide for a maximum energy return to the source of supply for every operating position of the control system when the hoist motor is lowering an overhauling load.

It is also an object of this invention to provide a hoisting control system for a motor whereby the motor may be plugged from hoist to lower and lower to hoist either full-load or no-load with minimum current peaks, and with minimum voltage peaks.

One other object of this invention is to provide a dynamic lowering control system that will effect motor acceleration in the lowering direction smoothly, rapidly, at no-load or full-load, without harmful current peaks, and during a time interval that is shorter than has been possible heretofore.

A still further object of this invention is to provide for the most desirable graduated deceleration, of the motor controlled, from any high speed lowering to the inoperative or standstill position of the motor.

Other objects and advantages will become more apparent from a study of the following specification when considered in conjunction with the accompanying drawings, in which:

Figs. 2, 3, 4, 5 and 6 show the positions of the various motor circuit switches and the various motor circuits for all the controller positions during hoisting operations;

Fig. 7 shows a sequence chart showing the sequence of operation of the various switches in the motor circuits both for the hoisting and the lowering operations;

Fig. 8 shows a series of sample speed torque curves for all the controller positions of the motor when operating to lower loads that range from an overhauling load through no-load to full-load non-overhauling;

Figs. 9, 10, 11, 12 and 13 show the motor circuits for all controller positions during a lowering operation; whereas, Figs. 14 and 15 show the two dynamic braking circuits utilized to stop an overhauling or a non-overhauling load.

Figure 1:
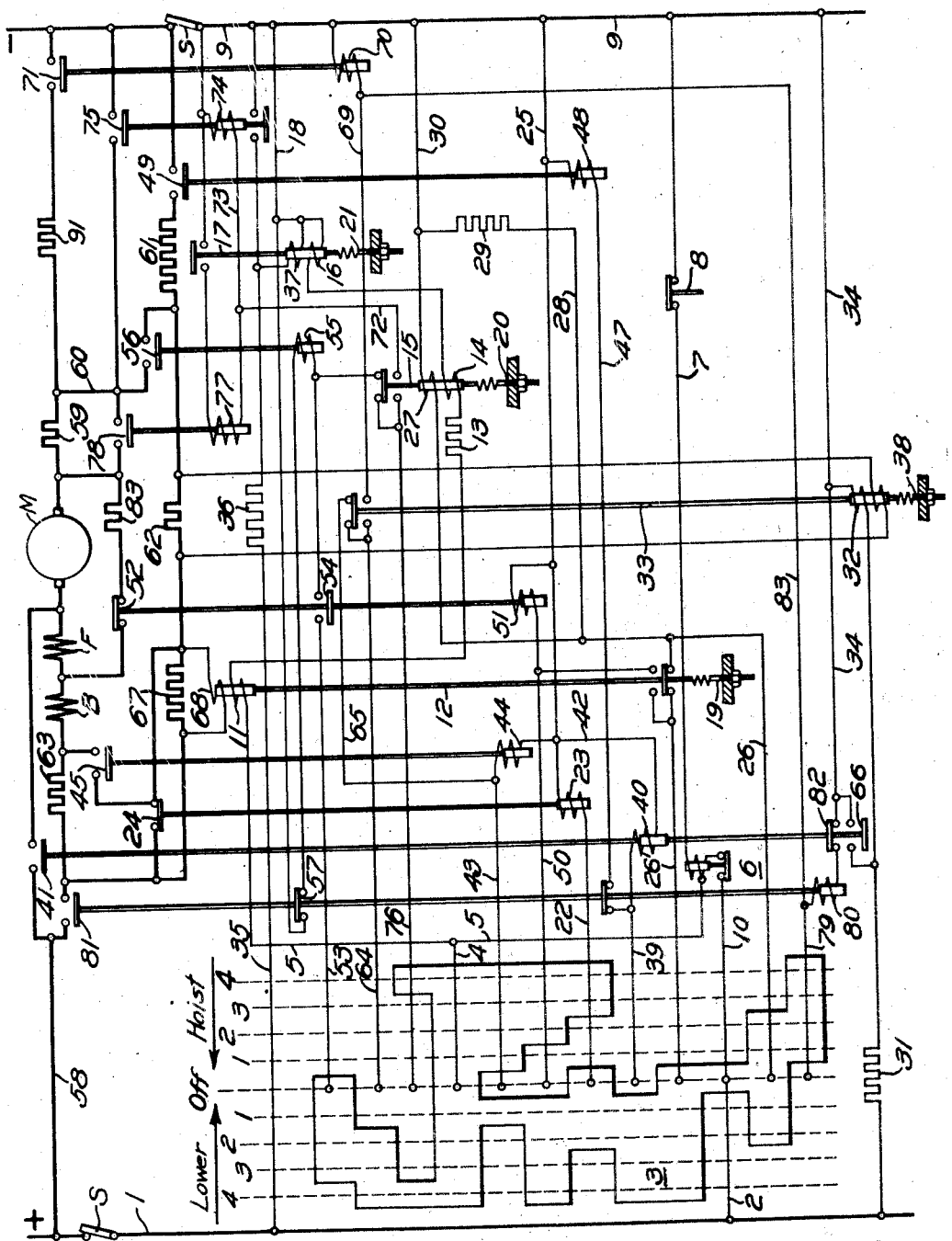
Figure 1 is a diagrammatic showing of the complete system of control embodying my invention.

Referring more particularly to Fig. 1 of the drawings, M designates the hoisting motor to be controlled and B and F refer respectively to the brake winding and field winding for the motor. The supply busses are designated by conductors 1 and 9 and the manually operable controller is designated by 3. A plurality of control relays and time limit devices are sequentially controlled by the controller 3, and, in conjunction with the controller 3, selectively control the operation of the contactors 41, 81, 24, 45, 52, 78, 56, 49, 71 and 75 for both the hoisting and lowering operations.

A better understanding of the novel and useful features of my invention can probably be had from a study of the operations of the control system and manually operable controller when hoisting a load or lowering a load or stopping a load that is being lowered by successively effecting a regenerative braking and a dynamic braking.

Assume that switches S are closed and that conductors 1 and 9 are thereby suitably energized from a source of direct-current power (not shown) and that the manually operable controller is in the neutral or off position. Under these conditions, a circuit is established from the energized conductor 1 through resistor 31, magnetizing coil 32 of the time-limit relay 33 and conductor 34 to the negatively energized conductor 9. A similar circuit is established from conductor 1, through conductor 35, resistor 36, the upper or magnetizing coil 37 of the time-limit relay 17 and conductor 18 to the energized conductor 9.

The controller segment 3 is also suitably energized from conductor 1, through conductor 2. Since the controller segment is thus energized, a circuit is established for the low-voltage relay 6 from the segment 3 through conductors 4 and 5, the actuating coil of the low-voltage relay 6, conductor 7, and stop switch 8 to the conductor 9. As soon as the actuating coil of the low-voltage relay 6 is energized, the contact members of this relay are closed and for all other operations of the manually operable controller the energization of the controller segment is effected through conductors 2 and 10, the lower contact members of the low-voltage relay 6 and conductors 5 and 4. It is, therefore, obvious that as long as the voltage does not drop below a predetermined value, the controller segment 3 will be energized regardless of whether it be in the off position or any one of the hoisting or lowering positions.

The closing of the switches S, as pointed out, energizes the controller segment 3, thereby establishing a circuit from controller segment 3, through conductors 4 and 5, neutralizing coil 11 of time-limit relay 12, resistor 13, neutralizing coil 14 of the time-limit relay 15, neutralizing coil 16 of the time-limit relay 17 and conductor 18 to the negatively energized conductor 9. At this stage of operation, energization of the neutralizing coils does not in any way affect the operation of the time-limit relays but only after the magnetizing coils have been energized and are then being deenergized do the neutralizing coils produce their effect in a manner pointed out more in detail hereinafter.

With the controller in the off position, a circuit is also established from the segment 3, through conductor 22, actuating coil 23 of contactor 24, and conductor 25 to the conductor 9. A further circuit is established from the controller segment 3 through conductor 26', the lower or back contact members of the time-limit relay 12, magnetizing coil 27 of the time-limit relay 15, which coil is connected in parallel circuit relation to conductor 28 and resistor 29, and conductor 30 to the energized conductor 9. It will be noted that magnetizing coil 27 may also be energized through conductor 26 as long as the controller is either in the off position or the first and second positions for both the lowering and hoisting operation. Since the magnetizing coils 32, 27 and 37 of the time-limit relays 32, 15 and 17, respectively, are energized, the upper or make contacts of time-limit relays 33 and 15 are closed and the contact members of the time-limit relay 17 are opened. All of the time-limit relays 12, 33, 15 and 17 are provided with spring-adjusting means 19, 38, 20 and 21, respectively, by means of which the inductive time constants of these relays may be adjusted.

If it be assumed that the attendant wishes to hoist the load, the controller may be moved to the first hoisting position, thereby opening the circuit for the actuating coil 23 of the contactor 24 which immediately opens. However, even though conductor 26' be deenergized at the controller segment, the circuit for the magnetizing coil 27 is retained through conductor 26.

In the first hoist position, a circuit is established from the controller segment 3 through conductor 43, actuating coil 44 of the contactor 45 and conductor 25 to the energized conductor 9. It is, therefore, obvious that contactor 45 is closed at the same time that contactor 24 is opened. A further circuit is established from the controller segment 3, through conductor 79, actuating coil 80 of the contactor 81, back contact members 82 of the contactor 41, which is now in the open position, and conductor 34 to the energized conductor 9 and a second circuit is established from the energized conductor 79, through conductor 83, and actuating coil 70 of the line contactor 71 to the energized conductor 9.

Operation of both line contactors 81 and 71 establishes a motor circuit from the energized conductor 1, through conductor 58, line contactor 81, current limit resistors 63, and 67 and contactor 45 in parallel, brake winding B of the magnetic brake, the series field winding F, the armature of the motor M, and current limit resistor 59, current limit resistor 91 and line contactor 71 to the energized conductor 9. It will be noted that during this initial stage of operation resistor sections 63, 59 and 91 are in series with the armature and, in consequence, the voltage on the armature will be low and any tendency of the motor to accelerate will thus be a minimum. Furthermore, since the actuating coil 51 of the control contactor 52 is not energized, the contactor 52 is in the circuit-closing position, thereby establishing a shunt circuit for both the field windings F and the armature of the motor M, this shunt circuit extending through the contactor 52 and the resistor 83. The resistor 83 is usually of a relatively low resistance value, thereby further reducing the tendency of the motor to develop a strong torque. The motor will, therefore, slowly accelerate taking the slack out of the cables or chains and permitting the attendants at the load to adjust the hooks, etc., without a tendency on the part of the motor to hoist the load at all.

As the controller is moved to the second hoist position, all of the other circuits remain the same except for the control contactor 52. The actuating coil 51 is thus energized from the controller segment 3, through conductor 50. A better understanding of the change in the armature circuits involved for the respective hoist positions may be had from an inspection of Figs. 2, 3, 4, 5 and 6, respectively. It will be noted from Fig. 3 that the armature shunt is removed, but all of the resistor sections are still in series with the armature circuit.

Moving of the controller to the third hoist position establishes a circuit for the actuating coil 23 of the contactor 24 whereby the resistors 63 and 67 are shunted as shown in Fig. 4. Furthermore, conductor 26 is deenergized in the third controller position and, in consequence, the magnetizing coil 27 of the time-limit relay 15 is deenergized. The magetizing coil 27 thus discharges its energy through the resistor 29 and conductor 28, while the neutralizing coil 14 acting in opposition to the magnetizing coil 27 prevents sticking of the armature of the time-limit relay 15 and, furthermore, acting in conjunction with the spring-adjusting means 20 causes the upper contact members of the time-limit relay 15 to open and the lower contact members to close a predetermined interval of time after the movement of the controller to the third hoisting position.

When the controller is moved to the fourth hoisting position, a circuit is established from the controller segment 3, through conductor 76, the lower or back contact members of the time-limit relay 15, conductors 72 and 73, actuating coil 74 of the accelerating contactor 75 to the energized conductor 9. It will be noted that energization of the conductor 72 cannot cause the operation of the accelerating contactor 78 because the circuit for coil 77 of the accelerating contactor 78 is controlled by the contact members of the time-limit relay 17, which, in turn, is controlled by the operation of the accelerating contactor 75.

From the foregoing discussion, it is obvious that if the attendant through inadvertence or possibly malicious manipulations throws the controller over to the fourth position in one rapid motion, the acceleration cannot take place faster than a predetermined rate in view of the protecting operation of the time-limit relays 15 and 17, respectively. Even though conductor 76 may be energized, the energizing circuit for coil 74 cannot be established until after the lapse of a definite interval of time, after which interval of time the back contact members of the time-limit relay 15 close.

In the fourth position of the controller, the motor circuit will be the circuit shown in Figs. 5 and 6, which circuits are established successively subject to the control of the time-limit relays. After the operation of the accelerating contactor 75, the lower contact members of this relay are closed which thus establish a shunt circuit for the magnetizing coil 37 of the time limit relay 17. Time limit relay 17, thus operating in every respect like the operation of the time-limit relay 15, closes its contact members after the lapse of a definite interval of time. The actuating coil 77 may thus be energized from the conductor 72, through coil 77 and the contact members of time-limit relay 17 to the energized conductor 9. The accelerating contactor 78 thus closes, shunting the resistor 59 and thereby establishing the motor circuit indicated in Fig. 6.

While my invention is of great utility for controlling a motor operating the load in the hoisting direction and provides a system of control simpler, cheaper and more reliable than any system of control heretofore utilized in the art, my invention has particular utility and value when controlling the motor for operating a load in the lowering direction, which may be either over-hauling or non-overhauling, in which case the motor positively drives the load down.

For the lowering operation a current limiting resistor 61 must be used on the first lowering position. This resistor 61 is connected in series with the parallel combination of the armature and the field winding. This arrangement provides for the desired current through the field winding and in conjunction with the resistor 59 in series with the armature allows the proper current through the armature to give the desired torque on the first point lowering. If the speed of the motor is too slow it can be increased by inserting more resistance into the field.

It is well know that an overhauling load, i. e., one driving the motor, will return energy to the line, and the amount of energy returned will be more for a given speed for a strong field excitation than for a weak field excitation. For a constant overhauling torque the speed increase may be obtained by weakening the field excitation. But a speed variation may also be obtained by a resistor in series with the armature.

The resistance drop of the resistor thus may be adding or subtracting to the armature or line voltage to change the motor speed. From the foregoing explanation it is thus obvious that a motor that is being overhauled by a heavy load will obtain a higher speed with a large amount of resistance in series with the armature. (As readily appears from Figs. 9 to 13 inclusive, the external resistance in series with the armature and field winding is successively decreased whereas the resistance in series with the field winding is successively increased.)

The voltage changes on the armature and on the field winding are, therefore, exactly what is desired. For a non-overhauling load, or motoring load, which usually involves merely the blocks, hooks and chains, a rapid lowering is the most desirable operation, whereas if the motor is called upon to lower a heavy overhauling load the most desirable operation is to be able to limit the speed to any value desired, namely, down to zero speed.

With the devices heretofore known it was considered not possible to reduce the resistance in series with the armature down to zero but with the control system employing my invention the resistance value in series with the armature is varied from a given maximum value to almost zero. The amount of energy thus returned to the source of supply is a very maximum for any given overhauling load while the speed is a minimum. This is obvious, since a low armature resistance for an overhauling load means a low speed and at the same time a maximum return of energy to the line, whereas a low armature resistance for a motoring load means a maximum speed. Fig. 8 illustrates the speed torque curves of the motor for various controller positions where the load ranges from a given overhauling load through no-load, to somewhat above full-load. It will be noted that the speed torque curves are substantially parallel, nearly straight, and have a small slope angle. All of these features have not been attained by any of the devices of the prior art.

To more clearly bring out some of the novel features of my invention, further reference should be had to Fig. 8. On point one of the controller a speed torque curve is produced, showing approximately 10% speed at no load and 20% speed at full load. Assuming we desired a full load speed of 65% on the second controller position and the field is weakened accordingly; however, if the resistance in the armature circuit remains the same a higher speed results at full load to develop the desired retarding torque, and the motor operates on curve B which shows 65% to 144% speed from no-load to full-load. If, as I provide, the effective armature resistance is reduced simultaneously with the resistance increase in the field the result will be that the motor operates on curve C, i. e., at speeds varying from 65% to 80%.

As heretofore pointed out a maximum amount of energy may be returned to the line if the resistance in series with the armature be reduced to a minimum. Contrary to a first opinion of engineers and members of the trade it is not necessary to stabilize the circuit and the motor armature can thus be connected directly across the line.

The total resistance for lowering is generally in the neighborhood of 250% normal. This is too much for hoisting and some must be dispensed with. By reversing the field instead of the armature and closing contactor 81, as heretofore pointed out, resistors 67, 62 and 61 can be eliminated without the use of more equipment. Furthermore, reversing the connections of the field F and the brake B instead of the armature very materially aids in reducing the current peaks during plugging. There is also a somewhat greater delay in effecting the complete reversal of the motor, and since the field first decays to zero before building up in the opposite direction and since the brake sets for an instant during plugging a smooth yet effective reversal of the load is provided.

Assume that the attendant wishes to lower a non-overhauling load and to this end moves the controller to the first lowering position. In the first lowering position a circuit is established from the controller segment 3, through conductor 43, actuating coil 44 of contactor 45, and conductor 25 to the negatively energized conductor 9 and a second circuit is established from controller segment 2, through conductor 50, actuating coil 51 of contactor 52 to the energized conductor 25. Contactor 45 is, therefore, closed and the control contactor 52 controlling the shunt circuit for the armature and field winding is opened.

A further circuit is established from the controller segment 3, through conductor 39, actuating coil 40 of the line contactor 41, and conductor 42 to the energized conductor 25. Since the line contactor 81 is in the open circuit position, the back contact members of this contactor are bridged and a circuit is established from conductor 39, through the back contact members of line contactor 81, conductor 47, and actuating coil 48 of contactor 49 to the energized conductor 25. A still further circuit is established from the controller segment 3, through conductor 53, back contact members 54 of the control contactor 52, actuating coil 55 of the accelerating contactor 56, back contact members 57 of the line contactor 81, and conductor 18 to the energized conductor 9.

The operations just mentioned having closed the contactors 45, 41, 56 and 49 and opened the control contactor 52, a circuit is established for the motor M, which circuit extends from the conductor 1, through conductor 58, line contactor 41 to one terminal of the armature of the motor M, at which point the circuit divides; one part may be traced through the armature of the motor M, the resistor 59, conductor 60 and contactor 56 to the left-hand terminal of the resistor 61; the other circuit passes through the field winding F, the brake winding B, the contactor 45 and resistor 62 to the left-hand terminal of the resistor 61.

From this left-hand terminal of the resistor 61, the circuit is completed through the resistor and through the contactor 49 to the energized conductor 9. It is thus obvious that the motor is connected as a shunt motor for the lowering operation and that the brake winding B carries the field current. The design is such that the brake is adequately energized to release the motor. Since but a small resistance is in series with the field winding, the field is very strongly energized and the torque of the motor will be high. Furthermore, the provision of the resistors 59 and 61 provides for the proper current through the armature to give the necessary torque for the first point lowering. If the speed for the first point lowering is too slow, it is obvious that the resistance in series with the field may be increased but a further speed control may be obtained by a resistor in series with the armature, the resistance drop of the resistors 59 and 61 adding or subtracting to the armature or line voltage to change the speed. Consequently, the motor will reach a higher speed, particularly with an overhauling load with a large amount of resistance in series with the armature.

To increase the speed of the motor, the attendant may move the controller to the second lowering position whereby a circuit is established to energize conductor 64 from the controller segment 3. It will be noted though that during the initial operations in the lowering direction, when line contactor 41 is closed, the contact members 66 thereof were also closed and thus established a shunt circuit for the magnetizing coil 32 of the time-limit relay 33. Whether or not the actuating coil 70 of the accelerating contactor 71 be energized when the controller is moved to the second lowering position depends upon the time constant of the time-limit relay 33. Abusive operation of the controller can, therefore, not cause the contactor 71 to operate prior to the lapse of a predetermined interval of time determined by the time-limit relay 33.

If it be assumed that this time-limit relay has operated, a circuit is established from the conductor 64 through the back contact members of the time-limit relay 33, conductor 69 and actuating coil 70 to the energized conductor 9. Furthermore, as long as the time-limit relay has not completed its operation even though the controller may have been moved to the second lowering position, contactor 45 remains closed since coil 44 remains energized by a circuit from the energized conductor 64, through the upper contact members of the time-limit relays 33 to conductor 65 to the coil 44. If the necessary time has elapsed, coil 44 is deenergized and contactor 45 opens, thereby inserting resistor 63 in the field circuit and decreasing the resistance sufficiently for the armature circuit by the closing of the contactor 71. These operations thus establish a motor circuit such as is shown in Fig. 10.

If the controller be now moved to the third lowering position, the circuit for the actuating coil 23 of the contactor 24 is broken at the controller segment 3 and, in consequence, resistor 67 is inserted in the field circuit. The instant the resistor 67 is placed in the field circuit, the magnetizing coil 68, in view of the voltage drop across the resistor 67, is energized and upper contact members of time-limit relay 12 are closed and the lower contact members are opened. This operation, since conductor 26 is deenergized in the third lowering position of the controller, causes the deenergization of the magnetizing coil 27 of the time-limit relay 15 and also establishes an additional circuit for the actuating coil 51 of the control contactor 52, this circuit being from the energized conductor 26' through the upper contact members of the time-limit relay 12, to the coil 51. The utility of this arrangement will be pointed out more in detail hereinafter when discussing the braking operation. The motor circuits established by the movement of the controller to the third lowering position are shown in Fig. 11.

In the fourth lowering position of the controller coil 55 is deenergized by opening its circuit at the controller. In the third position, as pointed out, magnetizing coil 27 is deenergized, but if the operation to the fourth position is too rapid, coil 55 remains energized for a time determined by the time limit relay 15. The circuit for coil 55 may be traced from the controller segment 3 through conductor 76, the upper contact members of time limit relay 15, coil 55, back contact members 57 of line contactor 81 and conductor 18 to the conductor 9.

After the lapse of the desired time the coil 55 is deenergized and the lower contact members of time limit relay 15 are closed to establish a circuit for coil 74 of the contactor 75. Fig. 12 illustrates the motor circuit thereby established. The operation of contactor 75 causes the shunting of magnetizing coil 37 of time limit relay 17. Coil 77 of contactor 78 is thus energized after a definite time and the circuit shown in Fig. 13 is established for the motor. The field excitation of the motor as an inspection of Fig. 13 will show, is a minimum and the voltage across the motor terminals is a maximum. The energy returned to the line will be a maximum for any given overhauling load of the motor and the speed a minimum; for a non-overhauling load the speed will be a maximum.

Another outstanding feature of the foregoing operations or novel results attained by my invention by the sequence of operation of the various contactors, no matter how abusive the controller be manipulated or even if the timing devices fail to operate as desired, is that the armature circuit is not opened. Contactors 41 and 49 are closed during the entire lowering operation. There is thus no danger of an open circuit at these points for any of the controller positions. Contactor 71 connects resistors 91 and 61 in parallel and remains closed from the second to the fourth controller position whereas contactor 56 is closed from the first to the third controller positions. The armature circuit can, therefore, not be opened even though contactor 56 should open before contactor 75 closes. The danger of dropping the load is thus positively eliminated.

If it be desired to stop the motor, when a load is being lowered, the controller may be shifted from a lowering position to the off position. In the off position successive dynamic braking circuits such as shown in Figs. 14 and 15 are established and the load is brought to rest smoothly yet during a minimum of time. The first dynamic braking circuit in Fig. 14 provides a heavily excited field but the brake is not set, whereas the second circuit further increases the field excitation but the brake is also permitted to set to stop the load.

The stopping operation considered more in detail takes place as follows: In the off position coil 51 of the control contactor 52 is deenergized by operations at the controller but for the third and fourth controller positions the resistor 67 is in the motor circuit and the magnetizing coil 68 is energized. When the controller position is shifted to the off position the upper contact members of time limit relay 12 remain closed for a definite interval of time. At the same time contactors 24 and 56 are closed and the circuit shown in Fig. 14 is established. After the time limit relay 12 has operated to close its lower contact members the circuit shown in Fig. 15 is established.

As heretofore explained, the field winding is reversed during lowering, with reference to the connection during hoisting with the result that current peaks and voltage peaks are reduced to a minimum during plugging, the building up of the field naturally and smoothly preventing such peaks. Reversing of the field eliminates extra field resistors and field contactors, and resistors of smaller resistance values can be used.

Although applicant has shown and described certain specific embodiments of his invention, he is fully aware that modifications may be devised by those having had the benefits of his teachings as contained in this specification. His invention, therefore, is not to be restricted except insofar as is necessitated by the prior art and the spirit of the appended claims.

I claim as my invention:

1. In an electrical control system for a motor, in combination, a motor, a source of energy having a given voltage, said motor having an armature winding and a field winding, a controller, means responsive to said controller for selectively connecting said field winding and armature winding in series circuit relation and in parallel circuit relation without reversing the armature energization for the parallel circuit connection, means for progressively decreasing the effective resistance of the armature winding, means for progressively increasing the effective resistance of the field winding, and means for limiting the rate of change of said respective effective resistances.

2. In a control system for a motor, in combination, a source of energy having a substantially constant voltage, a motor having a field winding and an armature winding, means for connecting said motor to said source of energy as a shunt motor, field control means for progressively decreasing the voltage impressed on the field winding, means, operable simultaneously with said field control means, for progressively increasing the voltage impressed on said armature winding at the same time voltage on the field winding is progressively decreased, and means for preventing the rate of such changes to exceed certain maximum values.

3. In a system of control for a reversing motor, in combination, a source of electrical energy, a motor having a field winding, a controller, means responsive to certain operations of said controller to connect said motor as a series motor for hoisting loads, means responsive to other operations of the controller to reverse the connections of the field winding of the motor and connect said motor as a shunt motor to lower loads, and means responsive to said other controller operations for varying the voltages impressed on the armature from a given low voltage to the voltage of the source of energy and varying the voltage on the field winding from a given value to a lower value.

4. In a system of control for a reversing hoist motor, in combination, a motor having a field winding and an armature winding, a brake winding, a manually operable controller, a pair of resistors, means responsive to certain operations of said controller for connecting the armature and one of said resistors in parallel circuit relation to said field winding, brake winding and other resistor, a third resistor disposed to be connected in series circuit relation to said parallel circuits, means for varying the resistance value of the resistor in the field circuit and the resistance value of said third resistor, means for shunting the resistor in series with the armature winding, and time limit means adapted to prevent the variation in resistance value of said resistors and the shunting of the resistor in series with the armature winding to exceed a predetermined rate.

5. In a system of control for a reversing hoist motor, in combination, a motor having a field winding and an armature winding, a brake winding, a manually operable controller, a pair of resistors, means responsive to certain operations of said controller for connecting the armature and one of said resistors in parallel circuit relation to said field winding, brake winding and other resistor, a third resistor disposed to be connected in series circuit relation to said parallel circuits, means for varying the resistance value of the resistor in the field circuit and the resistance value of said third resistor, means for shunting the resistor in series with the armature winding, time limit means adapted to prevent the variation in resistance value of said resistors and the shunting of the resistor in series with the armature winding to exceed a predetermined rate, means responsive to certain operations of said controller for disconnecting said third resistor from the parallel circuit to thus establish a dynamic braking circuit, and means for disconnecting said brake winding from the dynamic braking circuit and for decreasing the effective resistance value of the dynamic braking circuit.

6. In a control system for a hoisting motor, in combination, a motor having an armature winding, a pair of circuits including a field winding, and brake winding, and field resistors disposed to be connected in series with the field winding and brake winding, and a resistor disposed to be connected in series with the armature winding, means for connecting said pair of circuits in parallel, a pair of external resistors, a source of energy, means for connecting said parallel circuit and one of said external resistors in series and to the source of energy, means for connecting said second external resistor in parallel with said first external resistor, means for shunting said second named external resistor, means for connecting said first named external resistor in series with the field winding, and means for shunting the resistor in series with the armature winding.

7. In a control system for a hoisting motor, in combination, a motor having a field winding, a brake winding and an armature winding, a plugging controller, means for connecting said field and brake winding in series for both hoisting and lowering, and means responsive to said controller to reverse the connections of both the field winding and the brake to permit the brake to set for an instant during plugging to retard the motor.

FRANK P. TAUGHER.